United States Patent
Koba et al.

(10) Patent No.: US 9,212,937 B1
(45) Date of Patent: Dec. 15, 2015

(54) FLOW METER DEVICE

(71) Applicant: Panasonic Intellectual Property Management Co., Ltd., Osaka-shi, Osaka (JP)

(72) Inventors: Yasuo Koba, Nara (JP); Kouichi Takemura, Nara (JP); Aoi Watanabe, Nara (JP); Yuji Fujii, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/410,410

(22) PCT Filed: Jun. 26, 2013

(86) PCT No.: PCT/JP2013/004010
§ 371 (c)(1),
(2) Date: Dec. 22, 2014

(87) PCT Pub. No.: WO2014/002499
PCT Pub. Date: Jan. 3, 2014

(30) Foreign Application Priority Data

Jun. 26, 2012 (JP) .................................. 2012-142635

(51) Int. Cl.
*G01F 1/20* (2006.01)
*G01F 1/66* (2006.01)

(52) U.S. Cl.
CPC ...................................... *G01F 1/667* (2013.01)

(58) Field of Classification Search
CPC .............. G01F 23/00; G01F 7/00; G01F 1/20
USPC ......................... 73/861.18; 702/51, 45, 50, 55
See application file for complete search history.

(56) References Cited

U.S. PATENT DOCUMENTS 3,641,817 A * 2/1972 Dory ....................... G01F 1/667
324/76.77
4,509,372 A * 4/1985 Mount ..................... G01F 1/668
73/861.28

(Continued)

FOREIGN PATENT DOCUMENTS

JP       2003-106882 A    4/2003
JP       2008-232750 A    10/2008

(Continued)

OTHER PUBLICATIONS

Extended European Search Report in European Application No. 13809116.0, dated Sep. 21, 2015, 5 pages.
International Search Report in corresponding International Application No. PCT/JP2013/004010, dated Jul. 23, 2013, 1 page.

*Primary Examiner* — Jewel V Thompson
(74) *Attorney, Agent, or Firm* — Brinks Gilson & Lione

(57) ABSTRACT

A flow meter device of a fluid includes a time difference measuring means which measures time for a received wave to reach a zero cross point after the received wave exceeds a reference voltage, after transmission of a signal, and a reference voltage setting means which changes the reference voltage from a minimum value to a maximum value, recognizes peak voltages of waves of the received wave based on a plurality of inflection points at which a time difference measured by the time difference measuring means when the reference voltage is changed from the minimum voltage to the maximum voltage, is significantly changed, and automatically sets the reference voltage to a point between peak voltages of particular two waves based on a ratio between the peak voltages, and the reference voltage is changed from a voltage which is close to the peak voltages of the two waves and the peak voltages are newly recognized, when the reference voltage is newly set.

5 Claims, 13 Drawing Sheets

(56) References Cited

U.S. PATENT DOCUMENTS

| | | | | |
|---|---|---|---|---|
| 6,625,549 B1 * | 9/2003 | Nawa | ............ | G01F 1/66 702/50 |
| 8,903,663 B2 * | 12/2014 | Shiba | ............ | G01F 1/667 702/48 |
| 2004/0020307 A1 | 2/2004 | Eguchi et al. | | |

FOREIGN PATENT DOCUMENTS

| JP | 4572546 B2 | 11/2010 |
|---|---|---|
| JP | 2012-26822 A | 2/2012 |

* cited by examiner

FLOW METER DEVICE

This application is a 371 application of PCT/JP2013/004010 having an international filing date of Jun. 26, 2013, which claims priority to JP 2012-142635 filed Jun. 26, 2012, the entire contents of which are incorporated herein by reference.

TECHNICAL FIELD

The present invention relates to a flow meter device of a fluid which measures the flow of the fluid such as gas and water, by using an ultrasonic wave.

BACKGROUND ART

As a conventional typical example of such a flow meter device of the fluid, there is a flow meter device shown in FIG. 11 (e.g., see Patent Literature 1).

This flow meter device includes a first ultrasonic transducer 32 attached to a fluid passage 31 through which the fluid flows, a second ultrasonic transducer 33 attached to the fluid passage 31, a switching means 34 which performs switching between transmission and reception of the first ultrasonic transducer 32 and the second ultrasonic transducer 33, a transmission means 35 which activates the first ultrasonic transducer 32 and the second ultrasonic transducer 33, an amplification means 36 which amplifies a signal which has been received by the ultrasonic transducer at a reception side and has passed through the switching means 34 to a predetermined amplitude level, and a reference voltage comparison means 37 which compares the voltage of the received signal which has been amplified by the amplification means 36 to a reference voltage.

As shown in FIG. 12, the reference voltage comparison means 37 compares the amplified received signal A to the reference voltage, and outputs a signal C from a timing c at which the magnitude relation between the amplified received signal A and the reference voltage is inverted to a zero cross point a that comes first after the timing c, and a determination means 38 outputs a signal D to a repeating means 39 at the zero cross point a.

The repeating means 39 counts the signal received from the determination means 38 at preset number of times, and outputs the signal received from the determination means 38 to a control means 42. A time measuring means 40 measures time for which the repeating means 39 has counted the preset number of times. A flow rate calculation means 41 calculates a flow rate based on the time measured by the time measuring means 40.

The control means 42 is configured to control the operation of the transmission means 35 based on the flow rate calculated by the flow rate calculation means 41 and output to the control means 42 and the signal output from the repeating means 39.

In this configuration, the control means 42 causes the transmission means 35 to operate and the ultrasonic transducer 32 to transmit an ultrasonic signal. Then, the ultrasonic signal propagates (travels) through the flow and is received by the second ultrasonic transducer 33. The ultrasonic signal is amplified by the amplification means 36, and then processed by the reference voltage comparison means 37 and the determination means 38. Then, the ultrasonic signal is input to the control means 42 through the repeating means 39. The above described operation is repeated preset n times, and the time measuring means 40 measures the time for the repeated operation.

The same operation is performed while performing switching between transmission and reception of the first ultrasonic transducer 32 and the second ultrasonic transducer 33, by the switching means 34. Transit time (propagation time) for which the ultrasonic signal propagates through a measurement target fluid from an upstream side to a downstream side (this direction will be referred to as a forward flow direction), and transit time for which the ultrasonic signal propagates through the measurement target fluid from the downstream side to the upstream side (this direction will be referred to as a reverse flow direction) are respectively measured, the flow velocity of the measurement target fluid is derived, and a flow rate Q is derived according to a formula (1).

When the effective distance between the ultrasonic transducers in a flow direction is L, measurement time that takes for the ultrasonic signal to propagate from the upstream side to the downstream side n times is t1, measurement time that takes for the ultrasonic signal to propagate from the downstream side to the upstream side n times is t2, the flow velocity of the measurement target fluid is v, the cross-sectional area of the fluid passage is S, and the angle formed between the propagation path of the ultrasonic wave between the ultrasonic transducers and the flow of the measurement target fluid is $\phi$, the flow rate Q of the measurement target fluid is represented by the following formula:

$$Q = S \cdot v = S \cdot L/2 \cdot \cos\phi((n/t1)-(n/t2)) \qquad \text{(formula 1)}$$

Actually, the flow rate is calculated by multiplying the formula 1 by a coefficient corresponding to the flow rate.

The gain of the amplification means 36 is adjusted so that the signal received by the ultrasonic transducer at the reception side has a constant amplitude. The gain is adjusted so that the peak voltage value of the received signal falls within a predetermined voltage range.

The above described flow meter device of the fluid is electrically activated by batteries, and required to reduce electric power consumption. It is considered that in this conventional flow meter device of the fluid, a reference voltage is newly set (e.g., see Patent Literature 2).

CITATION LIST

Patent Literature

Patent Literature 1: Japanese Laid-Open Patent Application Publication No. 2003-106882

Patent Literature 2: Japanese Patent Publication No. 4572546

SUMMARY OF INVENTION

Technical Problem

An object of the present invention is to provide a flow meter device of a fluid which is capable of setting a reference voltage quickly and accurately, maintaining the reference voltage at an optimal voltage value, and reducing electric power consumption while dealing with different gas kinds.

Solution to Problem

According to the present invention, there is provided a flow meter device of a fluid comprising: a first transducer and a second transducer which are provided in a fluid pipe and configured to transmit and receive an ultrasonic signal; a transmission means configured to activate the first and second transducers; a switching means configured to perform switching between transmission and reception of the first and second transducers; an amplification means configured to amplify a received signal of each of the first and second transducers; a time measuring means configured to measure cumulative time of transit time that takes for the ultrasonic signal to be transmitted and received repeatedly; a calculation means configured to calculate a flow velocity or a flow rate based on time measured by the time measuring means; a reference voltage comparison means configured to compare a voltage of the received signal which is output from the amplification means to a reference voltage and outputs a signal at a time point when a magnitude relation of the voltage of the received signal and the reference voltage is inverted; a determination means configured to output a signal at a time point when the determination means determines a negative zero cross point at which the voltage of the received signal which is output from the amplification means changes from a positive value to a negative value, the negative zero cross point coming first after the determination means receives the signal output from the reference voltage comparison means; a time difference measuring means configured to measure time difference between a time point when the signal is output from the transmission means and a time point when the signal is output from the determination means; a reference voltage setting means configured to change the reference voltage from a minimum voltage in a set range to a maximum voltage in the set range, to recognize as a plurality of peak voltages, voltage values in which the time difference measured by the time difference measuring means when the reference voltage is changed from the minimum voltage to the maximum voltage, is significantly changed, and to set the reference voltage to a voltage corresponding to a specified ratio value between a first peak voltage and a second peak voltage which are arbitrarily chosen from among the plurality of peak voltages, when a ratio value between the first peak voltage and the second peak voltage becomes the specified ratio value; a time difference storage means configured to store the time difference measured by the time difference measuring means when the reference voltage is set; a peak voltage storage means configured to store the first peak voltage and the second peak voltage of the reference voltage setting means; and a new reference voltage setting means configured to change the reference voltage from a voltage which is close to the first peak voltage in the set range to a voltage which is close to the second peak voltage in the set range, to newly recognize as the first peak voltage and the second peak voltage, voltage values in which the time difference measured by the time difference measuring means when the reference voltage is changed, is significantly changed, and to set the reference voltage to a voltage corresponding to a specified ratio value between the first peak voltage and the second peak voltage; wherein the reference voltage setting means is configured to newly set the reference voltage when a difference between the time difference measured by the time difference measuring means after the reference voltage is set and the time difference stored in the time difference storage means is equal to or larger than a predetermined value.

The present invention can also be practiced as a flow rate measurement method of the fluid.

Advantageous Effects of Invention

In accordance with the present invention, it is possible to provide a flow meter device of a fluid which is capable of setting a reference voltage quickly and accurately, maintaining the reference voltage at an optimal voltage value, and reducing electric power consumption while dealing with different gas kinds.

DETAILED DESCRIPTION OF THE PREFERRED EMBODIMENTS

The inventors intensively studied to provide a flow meter device of a fluid which is capable of setting a reference voltage quickly and accurately, maintaining the reference voltage at an optimal voltage value, and reducing electric power consumption while dealing with different gas kinds. As a result, the inventors found out the followings.

First of all, regarding the configuration disclosed in Patent Literature 1, the inventors conceived that the following configuration is used.

Figure 13:
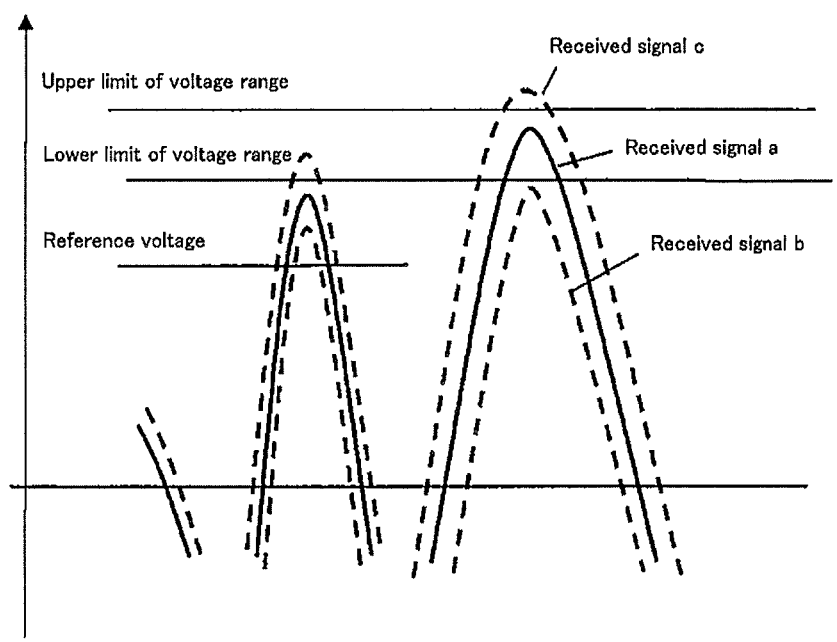
FIG. 13 is a view for explaining the operation of an amplification means of the conventional flow meter device of the fluid.

FIG. 13 is a view showing the relation between amplified received signals and set voltages. While repeating the measurement the number of times set in the repeating means 39, the number of times the peak voltage value of the received signal falls below the lower limit of a predetermined voltage range like a received signal b indicated by a dotted line of FIG. 13 and the number of times the peak voltage value of the received signal exceeds the upper limit of the predetermined voltage range like a received signal c indicated by a dotted line of FIG. 13, are counted, and the gain used at next flow rate measurement is adjusted based on the magnitude relation between the number of times the peak voltage value falls below the lower limit and the number of times the peak voltage exceeds the upper limit.

For example, in a case where the number of times the peak voltage value falls below the lower limit is more than the number of times the peak voltage value exceeds the upper limit, the gain is increased so that the peak voltage value falls within a range between the upper limit and the lower limit of the predetermined voltage range, like a received signal a indicated by a solid line of FIG. 13.

The reference voltage of the reference voltage comparison means 37 which is compared to the voltage of the received signal amplified by the amplification means 36 is to define the position of the zero cross point detected by the determination means 38. In the example of FIG. 13, the reference voltage is set to a mid voltage between the peak voltage of the second wave of the received signal and the peak voltage of the third wave of the received signal so that the determination means 38 detects the zero cross point a of the third wave of the received signal. With this setting, even if the peak voltage of the second wave of the received signal increases and/or the peak voltage of the third wave of the received signal decreases, for some reasons or other, a margin can be provided for both of these cases, and hence the determination means 38 can steadily detect the zero cross point a of the third wave.

In the conventional flow meter device of the fluid, as a method of setting the reference voltage to be compared to the received signal amplified to the predetermined amplification level, by the reference voltage comparison means 37, a method of setting the reference voltage by resistive voltage division using a fixed resistor and a semi-fixed resistor have been frequently employed. However, this method has a drawback that long time is taken to set the reference voltage and the semi-fixed resistor is likely to be adjusted erroneously, because the semi-fixed resistor is manually adjusted while monitoring the reference voltage so as to generate the specified voltage.

In addition, in some cases, the adjusted position may change due to a change which progresses over years, a mechanical vibration, a thermal impact, etc., after the adjustment. Because of this, the conventional method has a problem that when the sensitivities of the ultrasonic transducers change due to a temperature change, a flow rate change, and/or a change in the ultrasonic transducers which progresses over years, and other reasons, it is necessary to newly set the reference voltage.

Furthermore, in the conventional flow meter device of the fluid, the reference voltage is adjusted in the middle of the flow rate measurement, and therefore the timing, frequency and the like of the adjustment significantly affect the flow rate measurement. Besides, since the reference voltage is adjusted while changing the voltage, processing is increased, so that frequent adjustment accelerates battery wasting.

Moreover, depending on the gas kind, the characteristics and changes in the voltages are different. Therefore, depending on the gas kind, the number of times the reference voltage is adjusted may be increased.

To solve the above described problems, in a flow meter device of a fluid of the present invention, a reference voltage setting means changes a reference voltage from a voltage which is close to each of a first peak voltage and a second peak voltage which are pre-stored, newly recognizes the positions of peak voltages, and sets the reference voltage based on the peak voltages.

In addition, the reference voltage setting means sets an optimal reference voltage corresponding to each gas kind in such a manner that a reference voltage value is set with a ratio corresponding to the characteristic of the gas kind by changing the ratio between the peak voltages based on measurement time. This makes it possible to reduce the number of times the reference voltage is newly adjusted.

In the above described manner, the reference voltage set by the reference voltage setting means is set to a mid voltage between two peak voltages corresponding to adjacent two particular waves of the received wave of the ultrasonic signal. The flow meter device of the fluid is able to quickly perform the setting operation of the reference voltage which allows a time difference measured by a time difference measuring means to be optimal without human intervention, and continue to keep the reference voltage at an optimal voltage value.

According to a first aspect of the present invention, there is provided a flow meter device of a fluid comprising: a first transducer and a second transducer which are provided in a fluid pipe and configured to transmit and receive an ultrasonic signal; a transmission means configured to activate the first and second transducers; a switching means configured to perform switching between transmission and reception of the first and second transducers; an amplification means configured to amplify a received signal of each of the first and second transducers; a time measuring means configured to measure cumulative time of transit time that takes for the ultrasonic signal to be transmitted and received repeatedly; a calculation means configured to calculate a flow velocity or a flow rate based on time measured by the time measuring means; a reference voltage comparison means configured to compare a voltage of the received signal which is output from the amplification means to a reference voltage and outputs a signal at a time point when a magnitude relation of the voltage of the received signal and the reference voltage is inverted; a determination means configured to output a signal at a time point when the determination means determines a negative zero cross point at which the voltage of the received signal which is output from the amplification means changes from a positive value to a negative value, the negative zero cross point coming first after the determination means receives the signal output from the reference voltage comparison means; a time difference measuring means configured to measure time difference between a time point when the signal is output from the transmission means and a time point when the signal is output from the determination means; a reference voltage setting means configured to change the reference voltage from a minimum voltage in a set range to a maximum voltage in the set range, to recognize as a plurality of peak voltages, voltage values in which the time difference measured by the time difference measuring means when the reference voltage is changed from the minimum voltage to the maximum voltage, is significantly changed, and to set the reference voltage to a voltage corresponding to a specified ratio value between a first peak voltage and a second peak voltage which are arbitrarily chosen from among the plurality of peak voltages, when a ratio value between the first peak voltage and the second peak voltage becomes the specified ratio value; a time difference storage means configured to store the time difference measured by the time difference measuring means when the reference voltage is set; a peak voltage storage means configured to store the first peak voltage and the second peak voltage of the reference voltage setting means; and a new reference voltage setting means configured to change the reference voltage from a voltage which is close to the first peak voltage in the set range to a voltage which is close to the second peak voltage in the set range, to newly recognize as the first peak voltage and the second peak voltage, voltage values in which the time difference measured by the time difference measuring means when the reference voltage is changed, is significantly changed, and to set the reference voltage to a voltage corresponding to a specified ratio value between the first peak voltage and the second peak voltage; wherein the reference voltage setting means is configured to newly set the reference voltage when a difference between the time difference measured by the time difference measuring means after the reference voltage is set and the time difference stored in the time difference storage means is equal to or larger than a predetermined value. In this configuration, it becomes possible to provide the flow meter device of the fluid which is capable of setting the reference voltage quickly and accurately such that the reference voltage is very steady with respect to a change in the received signal of the ultrasonic wave.

According to a second aspect of the present invention, the flow meter device of the fluid according to the first aspect, comprises a voltage ratio determination means configured to decide a relation of the ratio value between the first peak voltage and the second peak voltage value in the reference voltage setting means, based on the time difference stored in the time difference storage means. In this configuration, by changing the ratio value based on the time difference stored in the time difference storage means, the ratio corresponding to the characteristics of the fluid can be set. As a result, steady measurement can be implemented.

According to a third aspect of the present invention, the flow meter device of the fluid according to the first or second aspect, comprises a temperature measuring means configured to measure a temperature; wherein the reference voltage is adjusted when the temperature measured by the temperature measuring means is changed by a specified value or larger. In this configuration, since the reference voltage is also adjusted based on a change in the characteristic due to a temperature change, a steady reference voltage can be set.

According to a fourth aspect of the present invention, in the flow meter device of the fluid according to any one of the first to third aspects, the reference voltage setting means is configured to change the reference voltage after an amplification degree of the amplification means is adjusted. In this configuration, the new voltage setting means limits the set range of the reference voltage to a range between the peak voltages of particular waves in a case where the reference voltage is set to a value between the particular waves of the received wave in the adjustment of the amplification degree of the flow meter device of the fluid. Therefore, even when the magnitude relation between the reference voltage and the peak voltages is changed due to a change in the received signal of the ultrasonic wave in the middle of the flow rate measurement, the reference voltage can be newly set after the amplification degree is adjusted. Thus, the flow meter device of the fluid is able to maintain the reference voltage at an optimal voltage value.

According to a fifth aspect of the present invention, the flow meter device of the fluid according to any one of the first to fourth aspects, comprises a time difference storage means configured to derive the time difference stored in the time difference storage means based on the cumulative time of the time measuring means. In this configuration, since the measurement time can be derived based on the average value, the determination as to the fluid can be performed accurately.

Hereinafter, the embodiments of the present embodiment will be described with reference to the drawings. The present invention is not limited to the embodiments.

Embodiment 1

Figure 1:
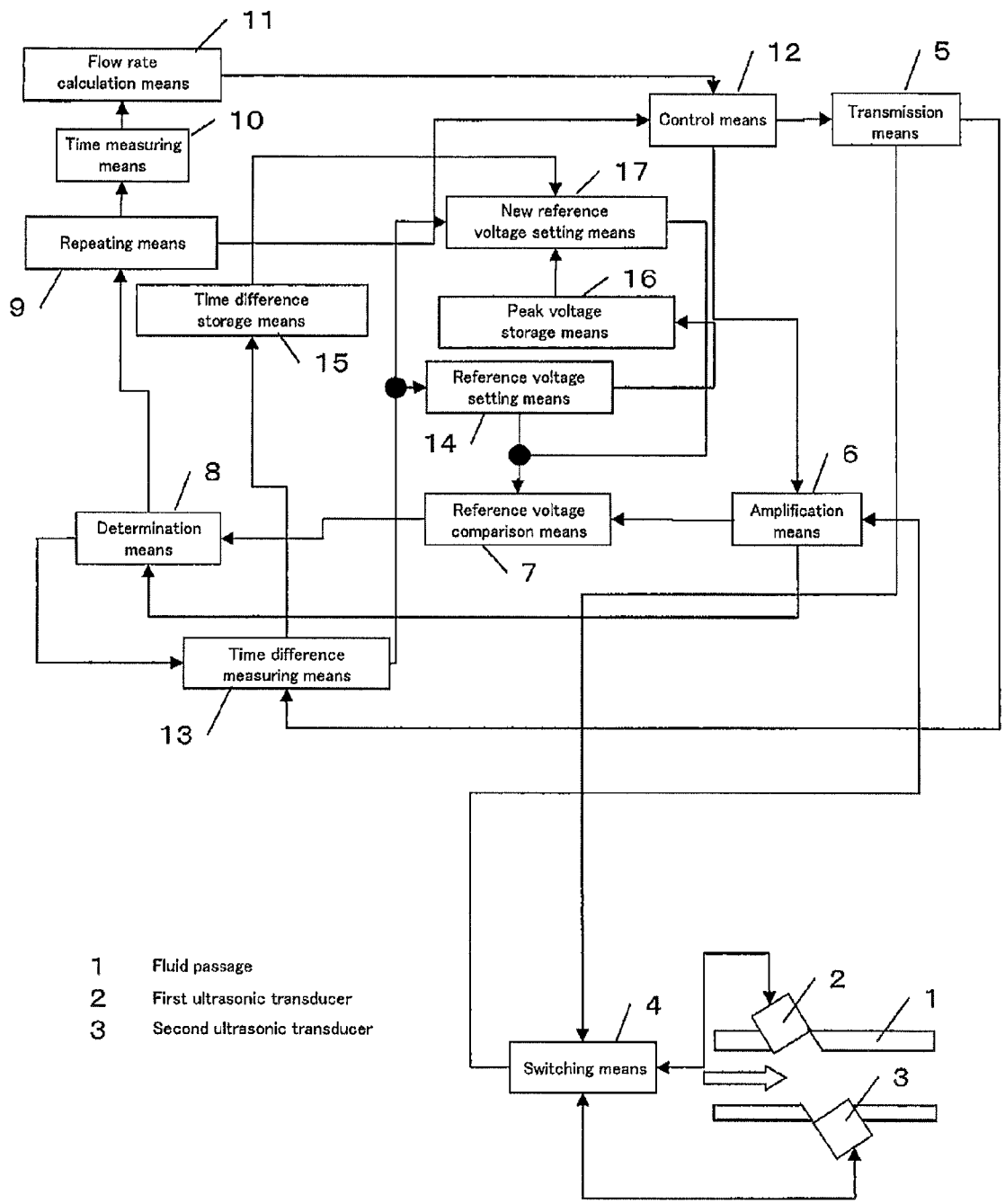
FIG. 1 is a block diagram of a flow meter device of a fluid according to Embodiment 1.
Figure 2:
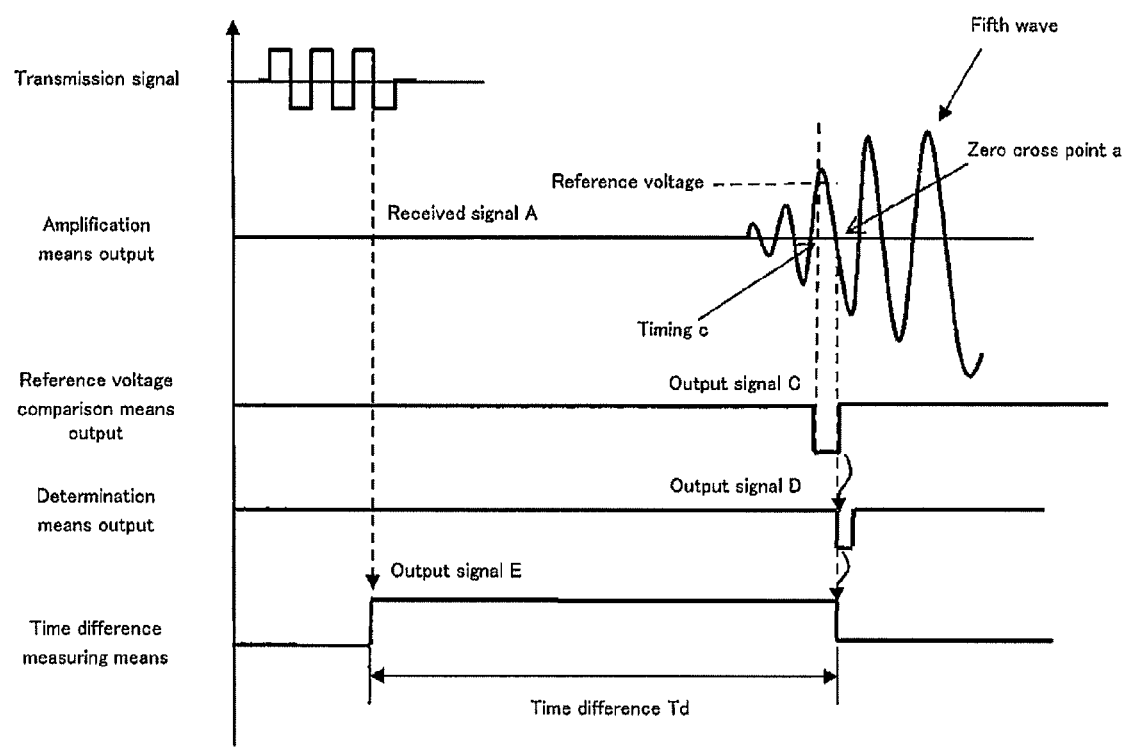
FIG. 2 is a view for explaining the operation of the flow meter device.
Figure 3:
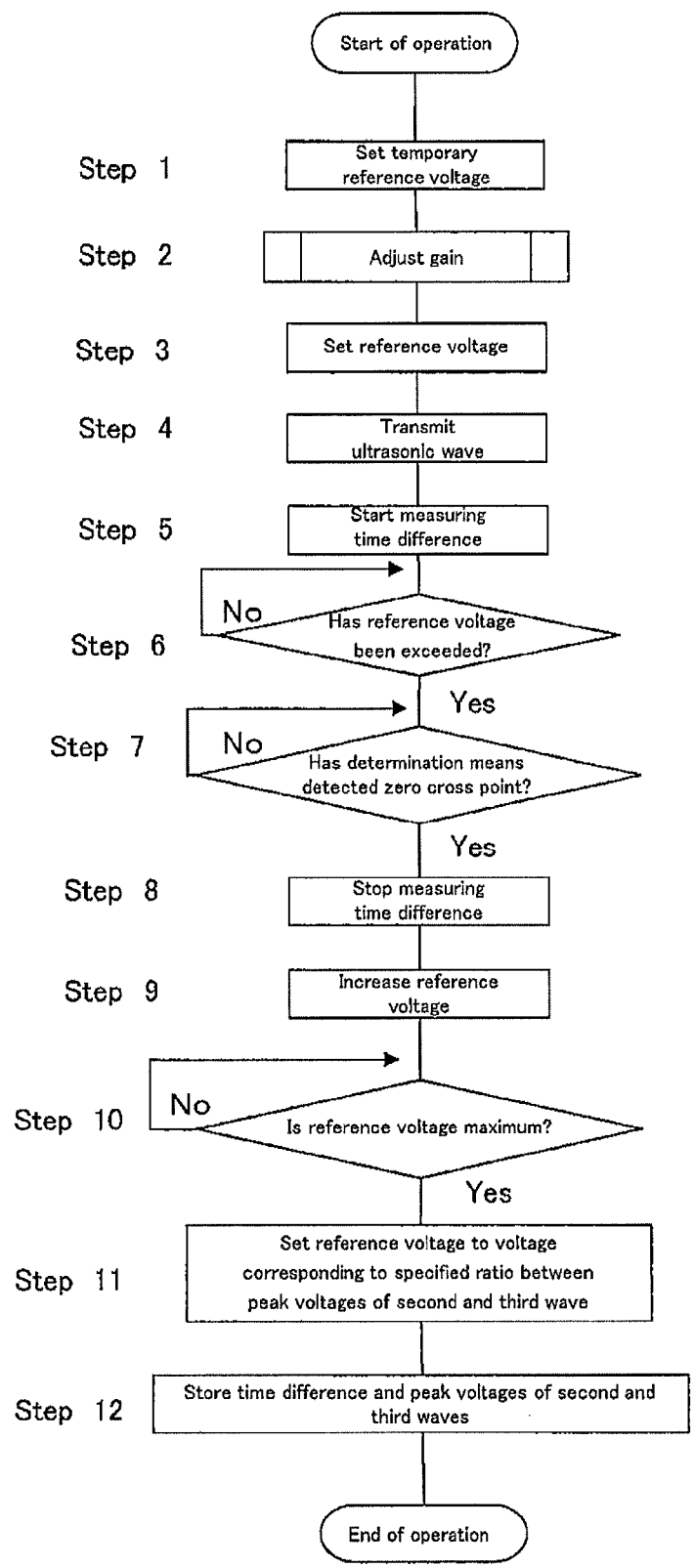
FIG. 3 is a flowchart showing a method of adjusting a gain in initial setting of the flow meter device.
Figure 4:
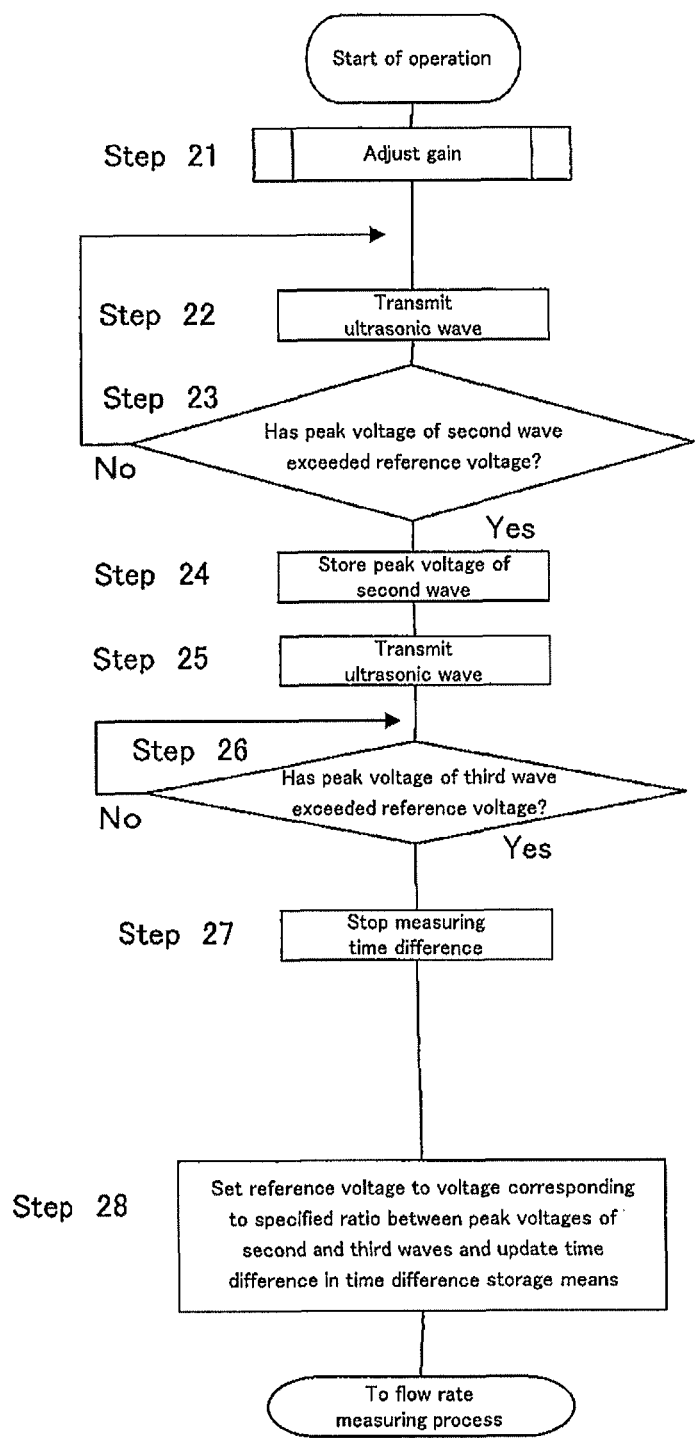
FIG. 4 is a flowchart showing a method of adjusting the gain in updating of the flow meter device.
Figure 5:
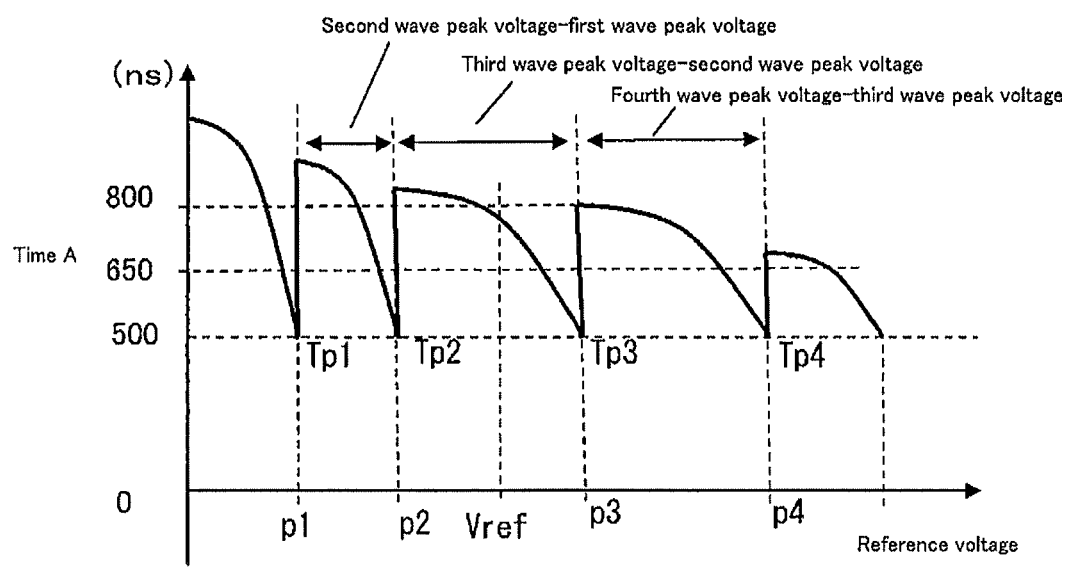
FIG. 5 is a view for explaining a method of detecting the peak voltages of the waves of a received wave while changing a reference voltage.

FIG. 1 is a block diagram of a flow meter device of a fluid according to Embodiment 1. FIGS. 2 and 5 are views for explaining the operation of the flow meter device of the fluid of Embodiment 1. FIGS. 3 and 4 are flowcharts showing the operation of the flow meter device of the fluid of Embodiment 1.

Referring to FIG. 1, a first ultrasonic transducer 2 (first transducer) which transmits an ultrasonic wave and a second ultrasonic transducer 3 (second transducer) which receives the ultrasonic wave are placed in the intermediate portion of a fluid passage 1 such that the propagation path of the ultrasonic wave form an angle $\phi$ with respect to a flow direction.

The fluid passage 1 may be, for example, a fluid passage having a rectangular passage cross-section. The fluid is not particularly limited, and may be, for example, gas such as fuel gas.

An activation signal output from a transmission means 5 is sent to the first ultrasonic transducer 2 or the second ultrasonic transducer 3 which is chosen as a transmission side by a switching means 4. An amplification means 6 amplifies the signal received by the first ultrasonic transducer 2 or the second ultrasonic transducer 3 which is chosen as a reception side by the switching means 4, by a gain corresponding to a command output from the control means 12. A reference voltage comparison means 7 compares the amplified signal to a reference voltage and outputs a signal.

The switching means 4, the transmission means 5, the amplification means 6, the reference voltage comparison means 7, and the control means 12 may be each constituted by, for example, a logic IC.

A determination means 8 determines the arrival time of the ultrasonic wave from the output of the reference voltage comparison means 7 and the received signal amplified by the amplification means 6. A repeating means 9 counts the signal of the determination means 8 and outputs a signal to the control means 12 repeatedly preset number of times. A time measuring means 10 measures time for which the repeating means 9 counts the signal the preset number of times. A flow rate calculation means (calculation means) 11 detects the flow velocity of the fluid based on the time measured by the time measuring means 10, and further calculates the flow rate in view of the size of a pipe, a flow state, etc.

The determination means 8, the repeating means 9, the time measuring means 10, and the flow rate calculation means (calculation means) 11 may be each constituted by, for example, a logic IC.

The control means 12 receives the signal from the flow rate calculation means 11 and the signal from the repeating means 9, and controls the operation of the transmission means 5 and the operation of the amplification means 6. A time difference measuring means 13 measures a time difference between the output of the transmission means 5 and the output of the determination means 8. A reference voltage setting means 14 sets the reference voltage of the reference voltage comparison means 7, and sets a mid voltage between the peak voltage of the third wave of the received signal and the peak voltage of the fourth wave of the received signal, with a specified voltage ratio. A time difference storage means 15 stores the time difference measured by the time difference measuring means 13 after the reference voltage setting means 14 has set the reference voltage.

The time difference measuring means 13, the reference voltage setting means 14 and the time difference storage means 15 may be each constituted by, for example, a logic IC.

A peak voltage storage means 16 stores the peak voltage of the second wave of the received signal and the peak voltage of the third wave of the received signal, which have been used in the reference voltage setting means 14. A new reference voltage setting means 17 newly sets the reference voltage when the time reference in the time difference storage means 15 is equal to or larger than a predetermined value.

The peak voltage storage means 16 may be constituted by, for example, a logic IC.

The new reference voltage setting means 17 may be constituted by, for example, a logic IC.

Hereinafter, the operation and advantages of the flow meter device of the fluid configured as described above will be described.

Initially, the control means 12 initiates the operation as follows, in a manufacturing step dedicated mode in manufacturing steps in response to a command input for mode shifting (not shown).

After a power is ON, the control means 12 sets a temporary reference voltage to adjust a gain (step 1 of FIG. 3). As shown in FIG. 2, the gain is adjusted and set so that for example, the peak voltage value of a fifth wave which is the maximum amplitude of the received wave reaches a specified voltage value. At this time, the reference voltage may be any voltage so long as the reference voltage is higher than the peak voltage of the first wave and lower than the peak voltage of the fifth wave.

During the gain adjustment, the reference voltage is fixed. This is intended to prevent a situation in which due to a change in the reference voltage, the reference voltage becomes equal to or higher than the peak voltage of the fifth wave or becomes equal to or lower than the peak voltage of the first wave, and the reference voltage comparison means 7 and the determination means 8 fail to operate correctly.

The gain adjustment of the flow meter device of the fluid may be similar to that of the conventional example, and will not be described repeatedly, in the present embodiment.

Initially, the gain is adjusted so that the signal received by the second ultrasonic transducer 3 as the reception side has a constant amplitude (step S2). Then, the reference voltage setting means 14 sets the reference voltage to a minimum voltage in a set range (step 3).

After the reference voltage setting means 14 sets the reference voltage to the minimum voltage, the control means 12 sets the number of times of repeating of the repeating means 9 to one and causes the transmission means 5 to operate and the first ultrasonic transducer 2 to transmit an ultrasonic signal (step S4).

The ultrasonic signal transmitted from the first ultrasonic transducer 2 propagates (travels) through the flow of the fluid passage 1, is received by the second ultrasonic transducer 3, is amplified by the amplification means 6, and then is output to the reference voltage comparison means 7 and to the determination means 8.

FIG. 2 shows the amplified received signal. As shown in FIG. 2, receiving a signal E output from the transmission means 5 which is time measuring start timing, the time difference measuring means 13 starts to measuring time (step 5). The reference voltage comparison means 7 compares the output (received signal A) of the amplification means 6 to the reference voltage (step 6 of FIG. 3). At the time point (timing c) when the magnitude relation between the received signal A and the reference voltage is inverted, the reference voltage comparison means 7 outputs a signal C to the time difference measuring means 13 and to the determination means 8.

The determination means 8 determines a negative zero cross point a which comes first after the timing C, at which the sign of the signal output from the amplification means 6 changes from a positive value to a negative value, as a point at which the ultrasonic wave arrives (step S7), and outputs a signal D to the repeating means 9 and to the time difference measuring means 13.

Receiving the signal D output from the determination means 8, the time difference measuring means 13 finishes measuring time (step S8), and outputs a measurement time difference Td (i.e., time that passes from start of transmission of the ultrasonic wave to the zero cross point c) to the reference voltage setting means 14.

The reference voltage setting means 14 increases the reference voltage by one control unit (e.g., 2 mV) in a variable range of the reference voltage (step 9).

Since the number of times of repeating set in the repeating means 9 is one, the control means 12 receives the signal indicating that the repeating operation is finished, from the repeating means 9, and newly causes the transmission means 5 to operate and the first ultrasonic transducer 2 to transmit the ultrasonic signal.

The above described operation is repeated until the reference voltage setting means 14 sets the reference voltage to a maximum voltage in the set range.

In a state in which the reference voltage setting means 14 has set the reference voltage to the maximum voltage, there exist a plurality of inflection points at which the time difference measured by the time difference measuring means 13 is significantly changed, for a period during which the reference voltage setting means 14 changes the reference voltage from the minimum voltage in the set range to the maximum voltage in the set range.

Figure 6:
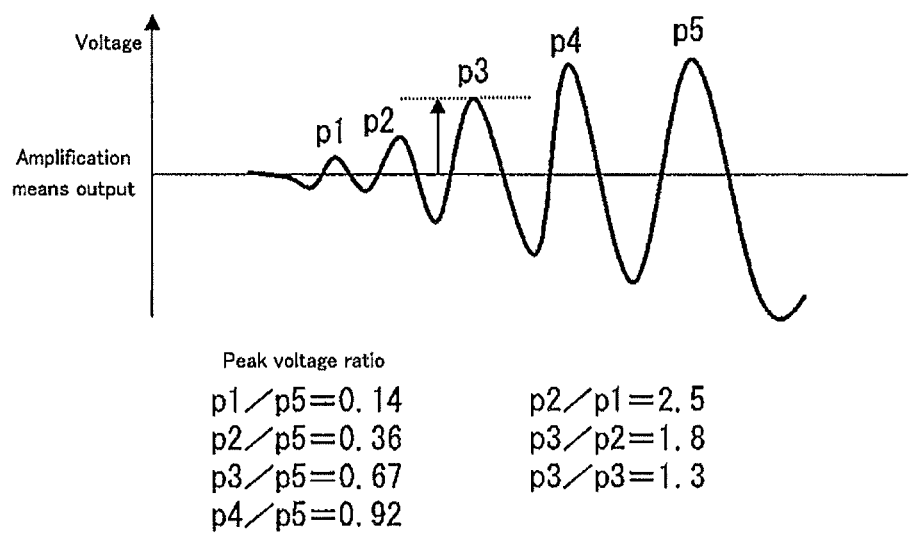
FIG. 6 is a view for explaining peak voltage ratios among the waves of the received wave.

The existence of the plurality of inflection points will be described with reference to FIGS. 5 and 6. FIG. 5 is a view showing the reference voltage in the case where the reference voltage setting means 14 changes the reference voltage from the minimum voltage in the set range to the maximum voltage in the set range, and the time (hereinafter this time will be referred to as time A) that passes from the time point (i.e., timing c) when the reference voltage comparison means 7 outputs the signal C to the zero cross point a.

When the reference voltage lies close to the peak voltage (peak p1, p2, p3, . . . in FIG. 6), the time A is minimum (Tp1, Tp2, Tp3, . . . corresponding to p1, p2, p3, . . . ) and its value is equal to about ¼ (500 ns in a case where an activation frequency is 500 KHz) of the cycle of the ultrasonic wave.

When the reference voltage is increased in the state in which the reference voltage lies close to the peak voltage, and exceeds the peak voltage of each wave, the time A is rapidly increased and emerges as the inflection point (Tp1, Tp2, Tp3, . . . as minimum time of time A) of the time A, as shown in FIG. 5. As shown in FIG. 5, the time A is changed 1.3 times or larger at each inflection point.

For example, in a case where the reference voltage is changed from one which is close to the peak voltage p2 of the second wave (does not exceed p2) and exceeds the peak voltage p2 of the second wave, the inflection point becomes Tp2. This means that the reference voltage corresponding to the inflection point of the time difference is the voltage which is close to the peak voltage of each wave of the received signal.

From an experiment, it was confirmed that each of the ratios among these peak voltages is a substantially constant value irrespective of the fluid passage and sensors. For example, as shown in FIG. 6, the ratio between the peak voltage p1 of the first wave and the peak voltage p2 of the second wave, i.e., p2/p1≈2.5, the ratio between the peak voltage p2 of the second wave and the peak voltage p3 of the third wave, i.e., p3/p2≈1.8, and the ratio between the peak voltage p3 of the third wave and the peak voltage p4 of the fourth wave, i.e., p4/p3≈1.3.

Since each of the ratios among these peak voltages of the waves is the substantially constant value as described above, the respective waves of the received wave can be recognized. Specifically, a particular peak voltage in which the ratio between this particular peak voltage and a peak voltage which emerges just before this particular peak voltage (the peak voltage which emerges just before this particular peak voltage and is lower than this particular peak voltage), is about 2.5 times, is the peak voltage of the second wave, while a particular peak voltage in which the ratio between this particular peak voltage and a peak voltage which emerges just before this particular peak voltage, is about 1.8 times, is the peak voltage of the third wave.

The reference voltage setting means 14 confirms the ratio between the peak voltages as described above, recognizes the peak voltages of particular waves (second wave and third wave) of the received wave, based on the corresponding peak voltage ratio, and sets the reference voltage to Vref derived using this specified peak voltage ratio between the particular waves (second wave and third wave) (step 11 of FIG. 3).

Then, the time difference storage means 15 stores the time difference measured by the time difference measuring means 13 after the reference voltage setting means 14 has set the reference voltage to Vref derived using the specified ratio between the peak voltages of the particular waves (second wave and third wave), and the reference voltage setting means stores the peak voltage (in the set range of the reference voltage) of the second wave and the peak voltage (in the set range of the reference voltage) of the third wave (step 12). Thus, the manufacturing step dedicated mode is terminated.

Since the peak voltage of the second wave and the peak voltage of the third wave are stored, the settable range of the reference voltage in which the point (e.g., negative zero cross point a of the third wave of FIG. 2) at which the arrival time of the ultrasonic signal in the manufacturing steps can be detected, is stored.

The purpose for setting the reference voltage to a mid voltage between the peak voltage of the second wave and the peak voltage of the third wave is as follows. The setting of the reference voltage in a reference voltage range (range from the peak voltage of the second wave to the peak voltage of the third wave in FIG. 6) which is broadest in peak voltage width follows that the reference voltage is set in a range in which the peak voltage difference between the waves of the received signal is largest. For example, in the example of FIG. 5, when the reference voltage is set to Vref derived using the specified ratio between the peak voltage of the second wave and the peak voltage of the third wave, a large margin is allowed to be set between the reference voltage and each of the peak voltage of the second wave and the peak voltage of the third wave. The specified ratio between the peak voltage of the second wave and the peak voltage of the third wave is expressed as (Vref-P2):(P3-Vref). For example, Vref is set so that this ratio is 55:45. Therefore, even when the voltage of the received signal is varied, the determination means 8 can very steadily detect the arrival time of the received signal of the ultrasonic wave. Alternatively, the measurement may be performed using the peak voltage of the third wave and the peak voltage of the fourth wave. In this case, the reference voltage range is narrowed, but the slope at the zero cross point a is steep, which enables the measurement with a higher accuracy.

After the reference voltage is set in the manufacturing steps, the control means 12 shifts to the normal mode, in response to a command input for mode shifting (not shown) in a place in which the flow meter device of the fluid is installed. Thereafter, when a power is ON, the flow meter device of the fluid initiates its operation as follows.

Now, with reference to FIG. 4, a description will be given of the operation of the new reference voltage setting means 17 which is performed to newly set the reference voltage in a case where the value measured by the time difference measuring means 13 exceeds a predetermined time in the middle of the flow rate measurement or in a case where the difference between the value measured by the time difference measuring means 13 and the value stored in the time difference storage means 15 is equal to or greater than a predetermined value, after the gain was initially adjusted so that the signal received by the ultrasonic transducer as the reception side had a constant amplitude (this operation may be omitted if the gain was already adjusted in the flow rate measurement) (step 21 of FIG. 4).

Upon the start of the operation, the new reference voltage setting means 17 sets the reference voltage to a voltage which is close to the peak voltage of the second wave which is stored, and the control means 12 causes the transmission means 5 to operate and the first ultrasonic transducer 2 to transmit an ultrasonic signal (step 22), and updates the peak voltage of the second wave, using a voltage in which the time difference measured by the time difference measuring means 13 is rapidly increased (step 23, step 24). In the same manner, the new reference voltage setting means 17 sets the reference voltage to a voltage which is close to the peak voltage of the third wave, and updates the peak voltage of the third wave (step 25, step 26, step 27).

Figure 7:
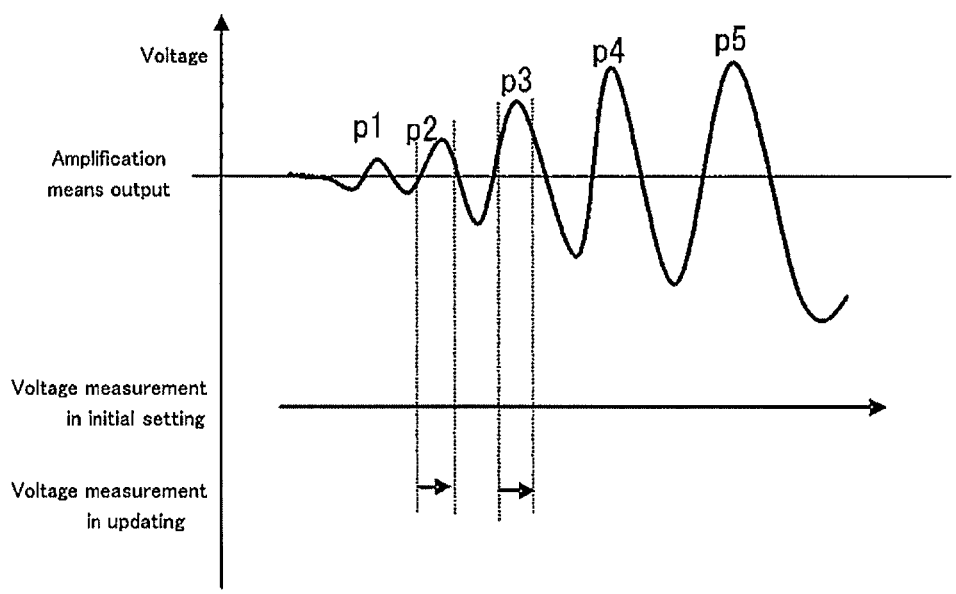
FIG. 7 is a view showing a comparison of a set voltage range of gain adjustment between the initial setting and the updating in the flow meter device.

FIG. 7 shows a voltage measurement range in updating of the reference voltage. As can be seen from FIG. 7, the voltage measurement range from a minimum voltage to a maximum voltage in the updating of the reference voltage at the time point when the flow meter device is installed, is much less than the voltage measurement range from a minimum voltage to a maximum voltage in the initial setting in the manufacturing steps.

The new reference voltage setting means 17 newly finds the voltage with the specified ratio from the peak voltage of the second wave and the peak voltage of the third wave, and thereby sets the reference voltage, and the time stored in the time difference storage means is updated (step 28). After that, the control means 12 shifts to a flow measuring process and a flow rate calculation process.

In brief, when conditions such as characteristics of a measurement target fluid and components of the flow meter device, etc., do not change after the time difference was stored in the time difference storage means 15 at the time of manufacturing, the relation between the reference voltage and the received wave which has been subjected to the gain adjustment is not varied, so that the time difference stored in the time difference storage means 15 should coincide with the time difference in the flow rate measurement. However, if the two time differences are different by a specified value or larger for some reasons or other, then the reference voltage is newly set.

As described above, when the reference voltage is newly set, the reference voltage is changed from the voltage which is close to the peak voltage of the third wave and the peak voltage of the fourth wave and the peak voltages are newly recognized. This makes it possible to reduce adjustment time, and newly set the reference voltage in a short time without interrupting the flow rate measurement in the middle of the flow rate measurement.

In summary, in the flow meter device of the fluid of the present embodiment, the reference voltage setting means changes the reference voltage from the minimum voltage to the maximum voltage, recognizes the peak voltages of the waves of the received wave from the plurality of inflection points at which the time difference measured by the time difference measuring means when the reference voltage is changed from the minimum voltage to the maximum voltage, is significantly changed, and automatically sets the reference voltage to an arbitrary point between the peak voltages of the particular two waves based on the peak voltage ratio, while when the reference voltage is newly set, the reference voltage is changed from the voltage which is close to the peak voltages of the particular two waves, and the peak voltages are newly recognized. This makes it possible to reduce adjustment time, and newly set the reference voltage in a short time without interrupting the flow rate measurement in the middle of the flow rate measurement.

Therefore, the flow meter device of the fluid is able to quickly set the reference voltage without human intervention, newly set the reference voltage in a short time and with less electric power consumption in the middle of the flow rate measurement after the reference voltage is set, and thus keep the reference voltage at an optimal one.

Embodiment 2

Next, Embodiment 2 will be described with reference to FIGS. 8 and 9.

Figure 8:
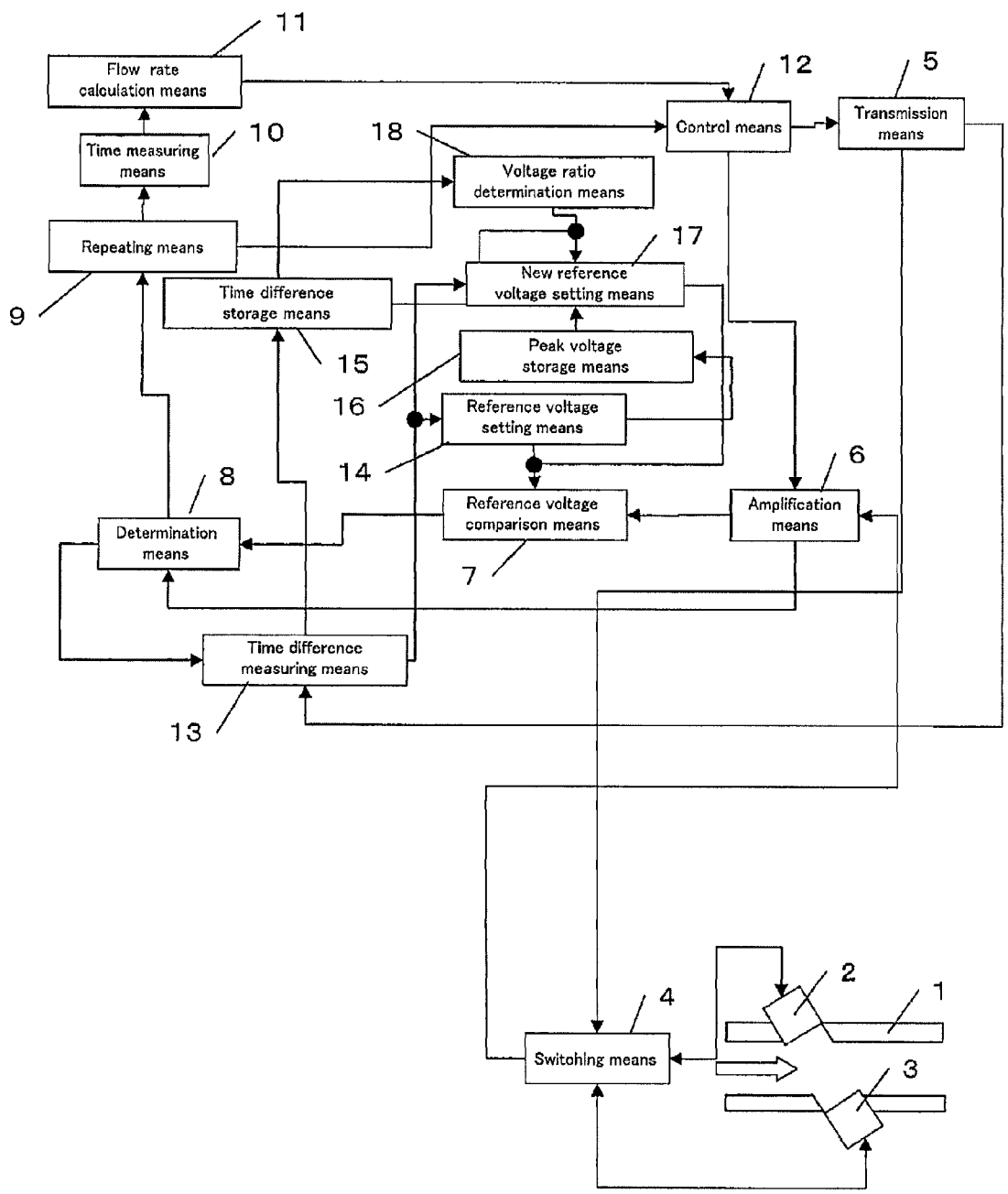
FIG. 8 is a block diagram of a flow meter device of a fluid according to Embodiment 2.

FIG. 8 is a block diagram of Embodiment 2. FIG. 9 is a flowchart showing the operation performed when the reference voltage is newly set.

Figure 9:
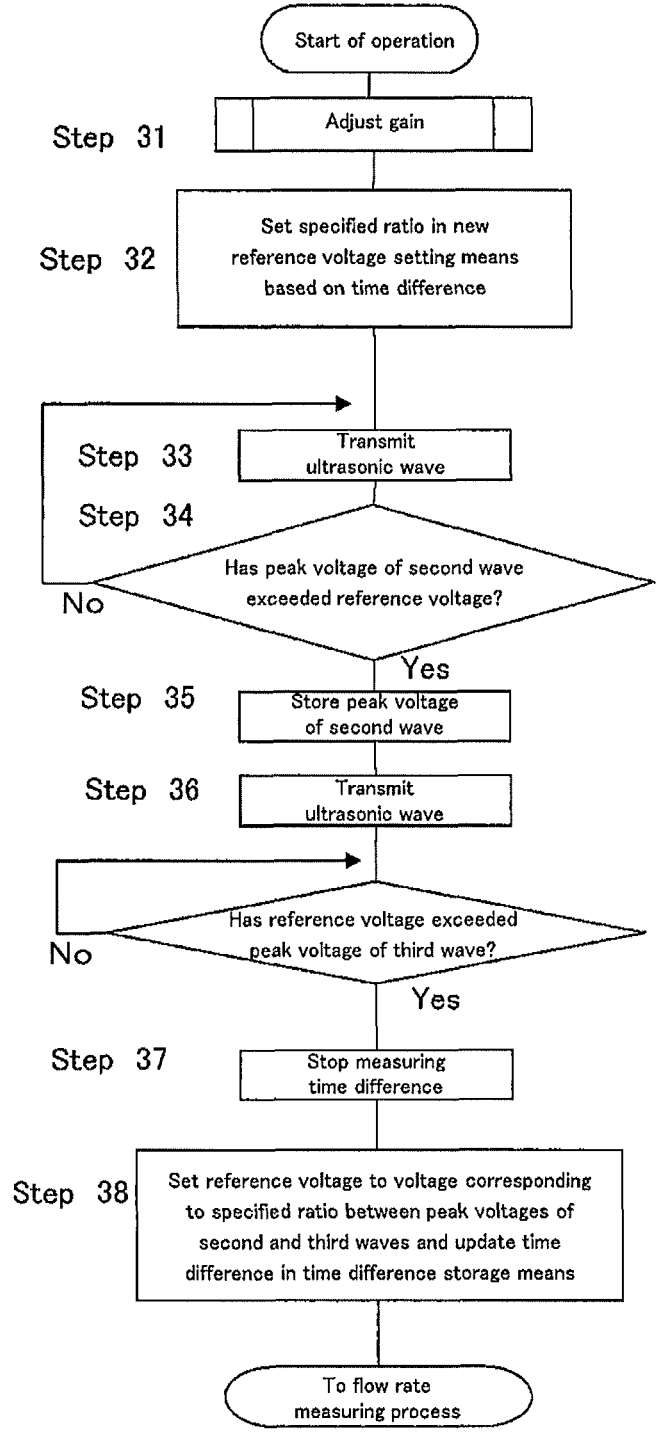
FIG. 9 is a flowchart showing a method of adjusting the gain in the updating of the flow meter device.

Embodiment 2 is different from Embodiment 1 in that the flow meter device of the fluid of Embodiment 2 includes a voltage ratio determination means 18 which sets in the new reference voltage setting means 17 a specified ratio with reference to a table which is preset or stored, based on the time difference measured by the time difference measuring means 13 in the example of FIG. 9.

The voltage ratio determination means 18 may be constituted by, for example, a logic IC.

The voltage ratio determination means 18 sets the specified ratio in the new reference voltage setting means 17 so that, for example, the reference voltage is set to a voltage of 50% of a voltage between the peak voltages when the time difference measured by the time difference measuring means 13 is equal to or larger than 200 μs and set to a voltage of 75% of a voltage between the peak voltages when the time difference measured by the time difference measuring means 13 is less than 200μ.

Embodiment 3

Figure 10:
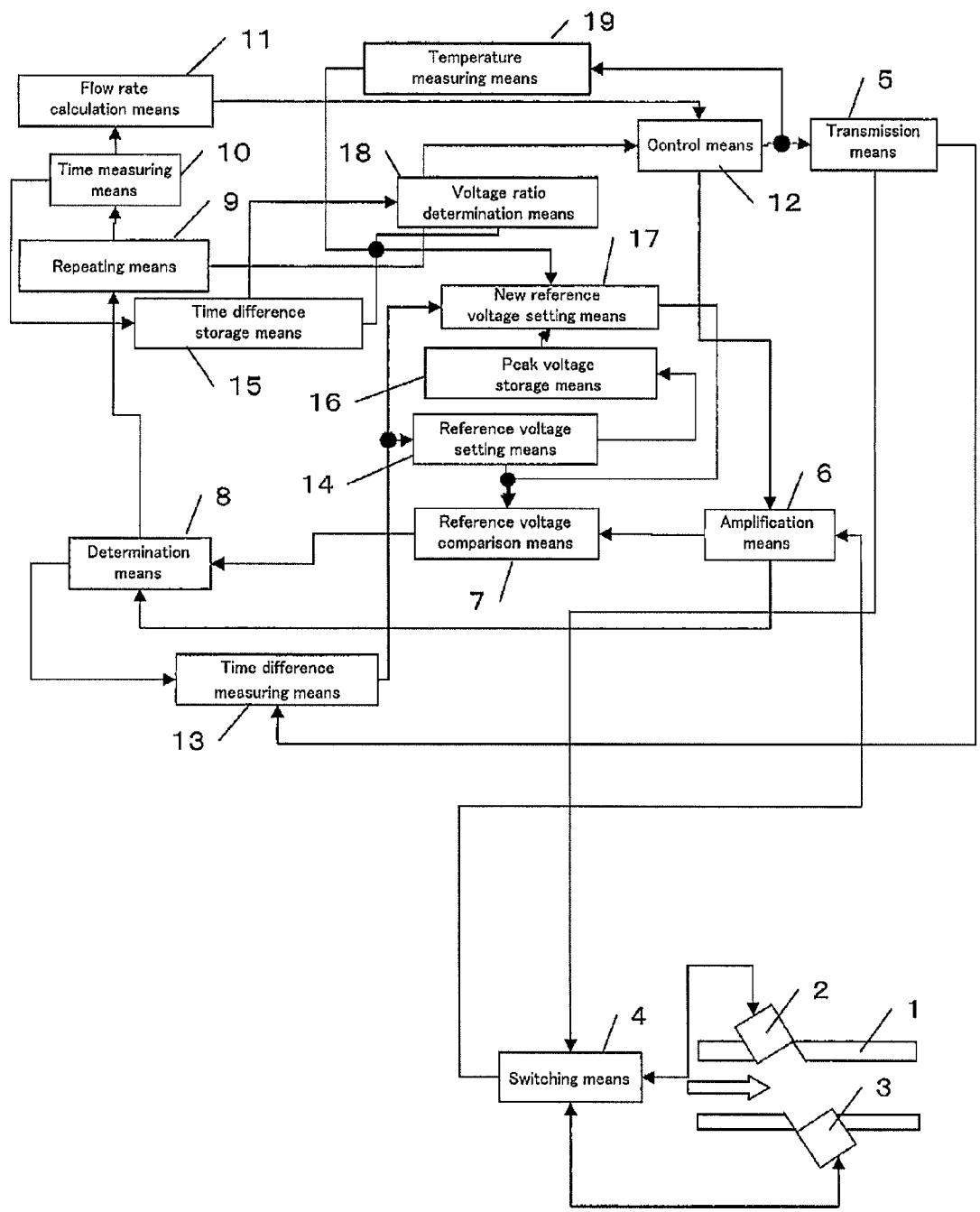
FIG. 10 is a block diagram of a flow meter device of a fluid according to Embodiment 3.
Figure 11:
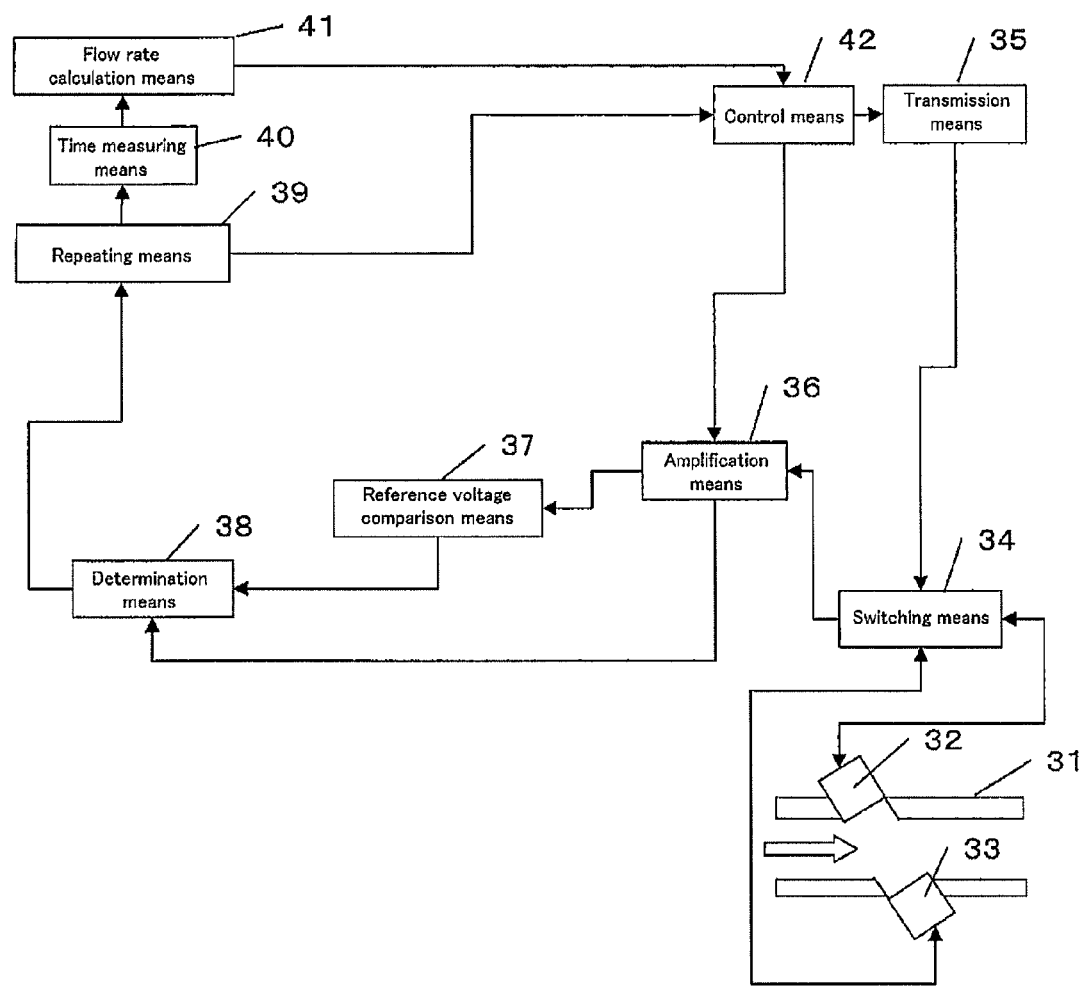
FIG. 11 is a block diagram of a conventional flow meter device of a fluid.
Figure 12:
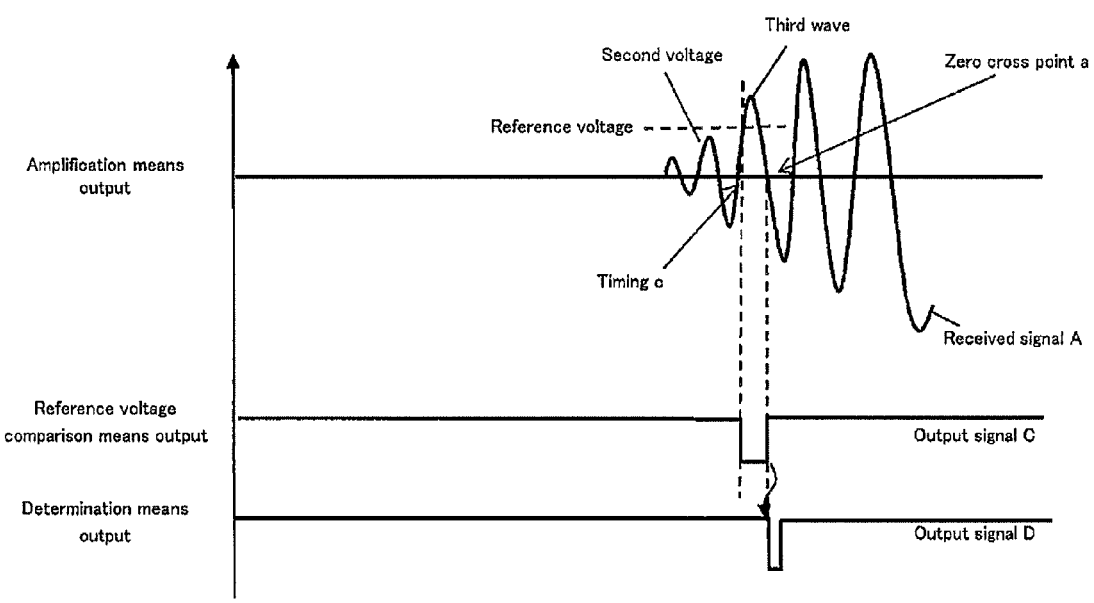
FIG. 12 is a view for explaining the operation of the conventional flow meter device of the fluid.

Next, Embodiment 3 will be described with reference to FIG. 10.

Embodiment 3 is different from Embodiment 1 and Embodiment 2 in that the flow meter device of the fluid of Embodiment 3 includes a temperature measuring means 19.

The time difference storage means 15 stores as the time difference an average value obtained by dividing cumulative time in the time measuring means 10 by the number of times of repeating. The voltage ratio determination means 18 can use this average value.

The control means causes the temperature measuring means 19 to measure a temperature on a regular basis, and commands the new reference voltage setting means 17 to perform new determination operation when the temperature is equal to or higher than a predetermined temperature. The temperature measuring means 19 may be constituted by, for example, a logic IC.

As described above, in the present embodiment, also, the flow meter device of the fluid is able to quickly set the reference voltage without human intervention, and keep the reference voltage at an optimal one during the flow rate measurement after the reference voltage is set. In addition, since the peak voltages can be stored and updated using the voltages which are close to the peak voltages, the time can be reduced, and the reference voltage can be updated in the middle of the flow rate measurement. Therefore, the flow meter device of the fluid is able to perform the flow rate measurement with a high accuracy as a system.

Moreover, a storage medium contains programs for executing the operation of the flow meter device of the fluid of the present embodiment. This can flexibly deal with changes in the specified ratios used in the control means 12 and the reference voltage setting means 14, the set values of the number of times of repeating used in the repeating means 9, etc., a replacement of the ultrasonic transducers, changes in the ultrasonic transducers which progress over time, etc.

Numeral improvements and alternative embodiments of the present invention will be conceived by those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

As described above, a flow meter device of a fluid of the present invention is able to quickly and accurately set a reference voltage and therefore is applicable to measurement of the flow velocity, the flow rate, and the like of a fluid such as gas and water.

What is claimed is:

1. A flow meter device of a fluid comprising:
   a first transducer and a second transducer which are provided in a fluid pipe and configured to transmit and receive an ultrasonic signal;
   a transmission means configured to activate the first and second transducers;
   a switching means configured to perform switching between transmission and reception of the first and second transducers;
   an amplification means configured to amplify a received signal of each of the first and second transducers;
   a time measuring means configured to measure cumulative time of transit time that takes for the ultrasonic signal to be transmitted and received repeatedly;
   a calculation means configured to calculate a flow velocity and/or a flow rate based on time measured by the time measuring means;
   a reference voltage comparison means configured to compare a voltage of the received signal which is output from the amplification means to a reference voltage and outputs a signal at a time point when a magnitude relation of the voltage of the received signal and the reference voltage is inverted;
   a determination means configured to output a signal at a time point when the determination means determines a negative zero cross point at which the voltage of the received signal which is output from the amplification means changes from a positive value to a negative value, the negative zero cross point coming first after the determination means receives the signal output from the reference voltage comparison means;
   a time difference measuring means configured to measure time difference between a time point when the signal is output from the transmission means and a time point when the signal is output from the determination means;
   a reference voltage setting means configured to change the reference voltage from a minimum voltage in a set range to a maximum voltage in the set range, to recognize as a plurality of peak voltages, voltage values in which the time difference measured by the time difference measuring means when the reference voltage is changed from the minimum voltage to the maximum voltage, is significantly changed, and to set the reference voltage to a voltage corresponding to a specified ratio value between a first peak voltage and a second peak voltage which are arbitrarily chosen from among the plurality of peak voltages, when a ratio value between the first peak voltage and the second peak voltage becomes the specified ratio value;

a time difference storage means configured to store the time difference measured by the time difference measuring means when the reference voltage is set;

a peak voltage storage means configured to store the first peak voltage and the second peak voltage of the reference voltage setting means; and a new reference voltage setting means configured to change the reference voltage from a voltage which is close to the first peak voltage in the set range to a voltage which is close to the second peak voltage in the set range, to newly recognize as the first peak voltage and the second peak voltage, voltage values in which the time difference measured by the time difference measuring means when the reference voltage is changed, is significantly changed, and to set the reference voltage to a voltage corresponding to a specified ratio value between the first peak voltage and the second peak voltage;

wherein the reference voltage setting means is configured to newly set the reference voltage when a difference between the time difference measured by the time difference measuring means after the reference voltage is set and the time difference stored in the time difference storage means is equal to or larger than a predetermined value.

2. The flow meter device of the fluid according to claim 1, comprising:

a voltage ratio determination means configured to decide a relation of the ratio value between the first peak voltage and the second peak voltage in the reference voltage setting means, based on the time difference stored in the time difference storage means.

3. The flow meter device of the fluid according to claim 1, comprising:

a temperature measuring means configured to measure a temperature;

wherein the reference voltage is adjusted when the temperature measured by the temperature measuring means is changed by a specified value or larger.

4. The flow meter device of the fluid according to claim 1, wherein the reference voltage setting means is configured to change the reference voltage after an amplification degree of the amplification means is adjusted.

5. The flow meter device of the fluid according to claim 1, comprising:

a time difference storage means configured to derive the time difference stored in the time difference storage means based on the cumulative time of the time measuring means.

* * * * *